United States Patent
Beauchesne et al.

(10) Patent No.: US 9,853,988 B2
(45) Date of Patent: *Dec. 26, 2017

(54) METHOD AND SYSTEM FOR DETECTING THREATS USING METADATA VECTORS

(71) Applicant: Vectra Networks, Inc., San Jose, CA (US)

(72) Inventors: Nicolas Beauchesne, Miami Beach, FL (US); David Lopes Pegna, San Carlos, CA (US); Karl Lynn, Winter Garden, FL (US)

(73) Assignee: Vectra Networks, Inc., San Jose, CA (US)

(*) Notice: Subject to any disclaimer, the term of this patent is extended or adjusted under 35 U.S.C. 154(b) by 51 days.

This patent is subject to a terminal disclaimer.

(21) Appl. No.: 14/944,138

(22) Filed: Nov. 17, 2015

(65) Prior Publication Data

US 2016/0191551 A1  Jun. 30, 2016

Related U.S. Application Data

(60) Provisional application No. 62/081,510, filed on Nov. 18, 2014.

(51) Int. Cl.
*H04L 29/06* (2006.01)
*G06F 17/30* (2006.01)
*G06F 21/55* (2013.01)

(52) U.S. Cl.
CPC .... *H04L 63/1416* (2013.01); *G06F 17/30525* (2013.01); *G06F 17/30598* (2013.01); *G06F 21/552* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 2003/0145232 A1 | 7/2003 | Poletto et al. | |
| 2004/0215976 A1* | 10/2004 | Jain | H04L 63/1458 726/23 |
| 2011/0138463 A1 | 6/2011 | Kim et al. | |
| 2012/0124666 A1 | 5/2012 | Kim et al. | |
| 2012/0278477 A1* | 11/2012 | Terrell | H04L 41/5009 709/224 |
| 2013/0219502 A1 | 8/2013 | Danford et al. | |
| 2014/0075536 A1 | 3/2014 | Davis et al. | |

FOREIGN PATENT DOCUMENTS

EP  2661049 A2  11/2013

OTHER PUBLICATIONS

International Search Report and Written Opinion dated Feb. 4, 2016 for PCT Appln. No. PCT/US15/61191.
Extended European Search Report dated Aug. 10, 2017 for EP Application No. 15860847.1.

* cited by examiner

*Primary Examiner* — Kambiz Zand
*Assistant Examiner* — Arezoo Sherkat
(74) *Attorney, Agent, or Firm* — Vista IP Law Group, LLP

(57) ABSTRACT

An approach for detecting network attacks using metadata vectors may initially involve receiving network communications or packets, extracting metadata items from the packets. The metadata items describe the communications without requiring deep content inspection of the data payload or contents. The communications may be clustered into groups using the metadata items. If a cluster exceeds a threshold, an alarm may be generated.

24 Claims, 11 Drawing Sheets

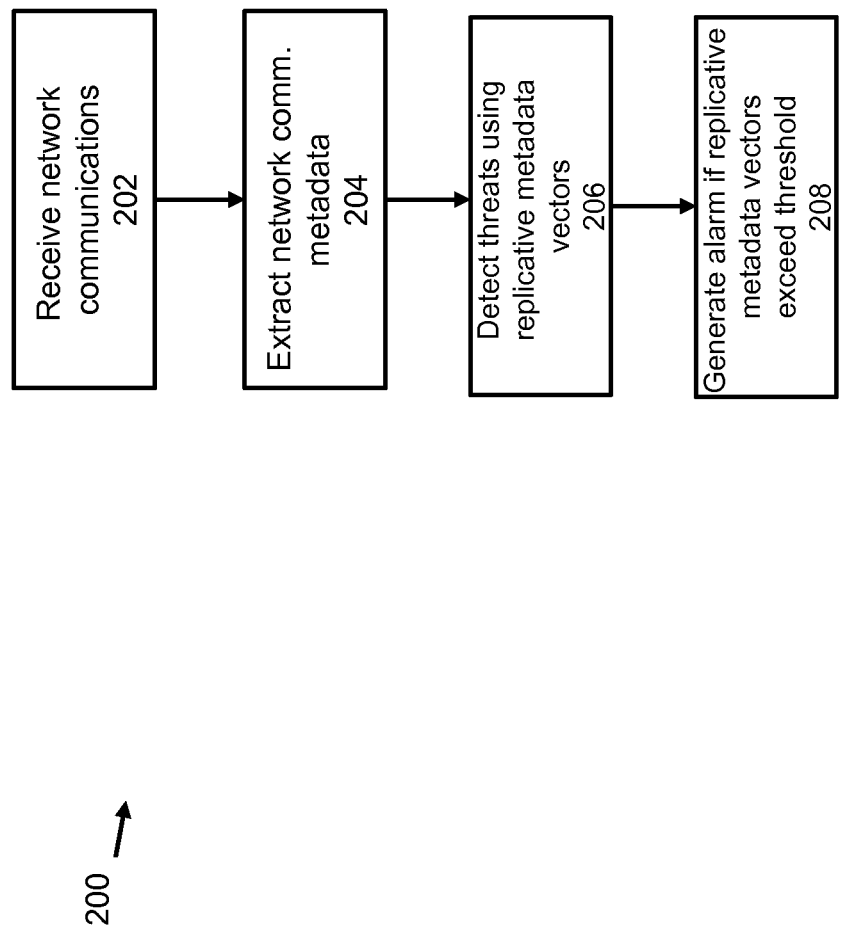

METHOD AND SYSTEM FOR DETECTING THREATS USING METADATA VECTORS

CROSS-REFERENCE TO RELATED APPLICATIONS

The present application claims the benefit of U.S. Provisional Application Ser. No. 62/081,510, filed on Nov. 18, 2014, titled "METHOD AND SYSTEM FOR DETECTING THREATS USING METADATA VECTORS", the content of the aforementioned application is hereby incorporated by reference in its entirety.

BACKGROUND

It is often an important goal for network security systems to be able to passively identify suspicious communications in a way that does not modify or disrupt the network. Typically, conventional passive network security systems, such as intrusion detection systems, rely on deep content inspection of packets to identify suspicious communications. Such approaches require deep knowledge, intricate parsing, and usually a library of signatures or heuristics for each type of suspicious activity that is to be identified. Often the library of signatures or heuristics can sprawl to 30,000 or more, which can make the use of such libraries unwieldy and/or computationally expensive. Furthermore, in some cases, deep content inspection may not be available due to restricted network permissions and/or the sensitivity of the data being transmitted. These requirements create an enormous burden on vendors seeking to create products that passively detect threats over a range of networking protocols.

As is evident, there is a need for an approach to passively identify suspicious communications or network threats without deep content inspection and/or sprawling signature libraries.

SUMMARY

Various embodiments of the invention are directed to a method, system, and computer program product for detecting threats using replicative metadata vectors. In some embodiments, a vector engine is implemented to detect threats in a network environment using metadata vectors. In some embodiments, the vector engine may first receive network communications for a network, extract metadata from the network communications, group the metadata into clusters, and if one or more metadata clusters exceeds a threshold size, generate an alarm. The network may comprise a plurality of client computers communicating with an outside network (e.g., the Internet), as well as internally with each other. In one example, when a computer is infected by a malicious payload sent by an outside attacker, the infected computer may send copies of malicious payloads to a number of other computers in the network to infect them as well.

In some embodiments, when this type of example network attack occurs, the vector engine may collect the above network communications by tapping the network through a network switch and making a copy of the network communications (e.g., packets) for analysis without disrupting or modifying the network communications. The vector engine may then extract metadata from the network communications that can be used to characterize the network communications without inspecting the contents of the packets. The vector engine may then group the metadata into matching clusters that allow the vector engine to track how many times a given network communication has occurred. If a certain type of network communication, such as one corresponding to a malicious attack, occurs too many times, the size of the cluster that holds metadata for the suspicious network communication will grow and may exceed a given threshold. If the threshold is exceeded, the vector engine may generate an alarm. In this way, a vector engine can use metadata to describe, categorize, and track network communications without the need for inspecting the contents of the network communications.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 2A shows an approach for detecting network threats using metadata vectors.

DETAILED DESCRIPTION

Figure 1:
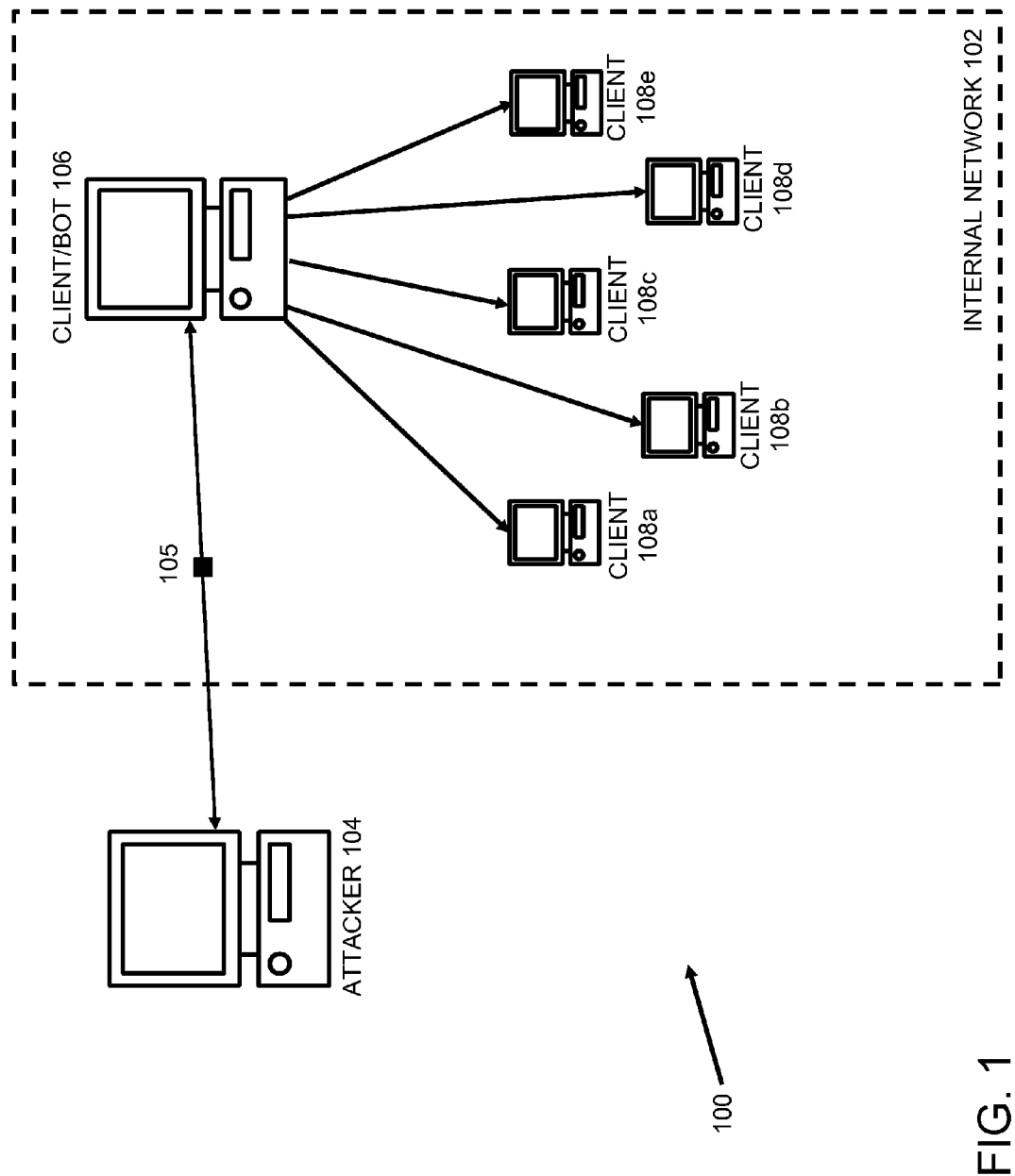
FIG. 1 illustrates an example network in which a vector engine may be implemented.

Various embodiments of the invention are directed to a method, system, and computer program product for detecting threats using replicative metadata vectors. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, the present invention encompasses present and future known equivalents to the components referred to herein by way of illustration.

Before describing the examples illustratively depicted in the several figures, a general introduction is provided for further understanding.

In some embodiments, a vector engine is implemented to detect network threats using metadata vectors. In some embodiments, the vector engine may first receive network communications, extract metadata from the network communications, group the metadata into clusters, and if the size of one or more metadata clusters exceeds a given threshold within a predefined period of time, generate an alarm. The network comprises a plurality of client computers communicating with an outside network (i.e. the internet) as well as internally with each other. When a computer is infected by a malicious payload, such as malicious automated instructions or script, the computer may act as a bot and may send copies of the same or a different malicious payload to a number of other computers in the network, to infect them as well. The malicious automated script may include logic that instructs the first infected computer to send the same or a different automated script to multiple other computers. The script may further be addressed to the same destination port on each computer. Further, when the multiple other computers receive and process (e.g., execute/interpret) the script, they may respond to the first computer using the same type of response.

Thus, in this case, for example, the characteristics of such an attack would be a first computer in a network sending substantially the same data (e.g., the malicious payload) of a set size, addressed to the same destination port on multiple other computers, each of which may respond to the first computer using substantially the same response message. Further, the time between each request and its matching response will typically be short (e.g., less than five seconds).

In some embodiments, the vector engine can collect the above network communications by tapping a network switch and making a copy of the network communications for analysis, without disrupting or slowing down the network. Next, the vector engine may extract metadata from the network communications that can be used to characterize the network communications without inspecting the contents. The vector engine may group the metadata into matching clusters that allow the vector engine to track how many times a given network communication has occurred. If a certain network communication, such as one corresponding to a malicious attack, occurs too many times, the cluster may grow in size and exceed a given threshold. If the threshold is exceeded or surpassed, the vector engine may generate an alarm or may flag the data for further monitoring.

As an example, if the threshold for a given cluster's size is ten, and a first computer is infected by a malicious payload and tries to spread copies of the same or different malicious payload to eleven other computers, then eleven instances of metadata will be generated by the vector engine. Further, because the eleven instances of metadata were all generated from the same source, the eleven instances of metadata will all have similar data items and can be grouped into the same cluster. As the threshold is ten, the size of the cluster containing the eleven instances exceeds the threshold and the vector engine may generate an alert to signal that the first computer is potentially attacking other computers on the network.

Described below are general non-limiting example definitions that may be used to understand or enhance understanding of how certain embodiments may be implemented.

A network is collection of computing entities that communicate with one another. In some embodiments, an internal network is a network of computers that are isolated from other (e.g., external) networks by networking components and/or devices as are known in the art, such as a firewall.

A client computer is a computer or node within a network. In some embodiments, a computer may act as a client and/or host depending on the type of connection with another computer. As used here, clients are generally uninfected but can become infected by malicious payloads, in which case they may act as bots for the outside or attacking entity.

An attacking computer is a computer or entity (e.g., malicious user) that initiates a malicious attack on a computer, client computer, or network. In some instances, an attacking computer may use a malicious payload to attack other computers in the network, whereby the malicious payload may infect a first computer inside the network and direct the first computer to distribute copies of the same or another malicious payload to other computers, who then may further replicate and distribute the malicious payload.

A bot is a client computer that is under the effective control of the attacking computer. For example, the attacking computer can use the bot to achieve further malicious goals, and/or perform tasks.

A malicious payload is a collection of instructions, which may be in the form of code (e.g., JavaScript) that is used to perform malicious tasks. The payload may in some form be compilable code, scripted code, or other types of instructions as is known to those of ordinary skill in the art. In some instances, malicious payloads may correspond to large toolkits that are 500 megabytes or more in size. In other instances, a malicious payload may be a small automated script, such as a script of 1 megabyte (or less) in size.

Vector metadata is metadata that is used to characterize and/or categorize network communications without inspecting the contents of the network communications (e.g., deep content inspection). For example, in some embodiments the metadata may comprise data from packet headers, and in some embodiments the metadata may be information that describes the overall session between two hosts. A metadata instance is a collection of one or more metadata items (e.g., packet information, session information) specific to a given network communication.

A metadata item is a parameter or item, such as a response size, that describes a certain feature of the network communication. For example, in some embodiments the metadata may comprise data from packet headers, and in some embodiments the metadata may be information that describes the overall session between two hosts. In some embodiments, a metadata item is used to characterize a network communication without inspecting the contents of the network communication. In some embodiments, the metadata item does not contain any reference or indicator of what is inside (e.g., the contents) of a network communication.

A metadata cluster is a grouping of metadata instances that may generally share similar metadata items. In some embodiments, a metadata cluster can be used to track how many network communications of a certain type have occurred.

A first communication is a communication initiated by one computer directed to another computer. In some embodiments, a first communication may take the form of a request or a "upstream" communication emanating from a client computer. In some embodiments, a first communication may correspond to a transmission that includes a file in a direction from a first computer to a second computer.

A second communication is a communication initiated by the second computer directed to the first computer. In some embodiments, a second communication may take the form of a response or a "downstream" communication received from the host or responding computer. In some embodiments, a second communication may correspond to a response message initiated in response to receiving and/or processing the first communication.

A network communication is a communication or session between two or more computers in a network using various networking protocols, such as TCP/IP. In some embodiments, a network communication comprises the first communication and a second communication as a pair, session, or session portion. In some embodiments, a network communication comprises an initiating message (e.g., request) in one direction that begins the communication, and a response message in the opposite direction, which may be a response to the initiating message. In some embodiments, a network communication may be a unilateral communication attempt by one computer where no response occurs (e.g., a failed request).

FIG. 1 illustrates an example networked environment 100 in which an outside computer 104 is attacking an internal network 102. The internal network 102 comprises a plurality of client computers 106 and 108a-e. As illustrated, the attacking computer may coax the client computer 106 to retrieve a malicious payload 105, such as an automated script, by sending a malicious email with an embedded web link. When the client computer 106 processes the malicious payload 105, it becomes a "bot". Under direction of the malicious payload, the client computer or bot 106 may then attempt to send copies of the same malicious payload or a different malicious payload to a plurality of client computers 108a-e. When the plurality of client computers 108a-e receive and process the replicated malicious payloads, they may respond to the bot computer 106 with a response message (not depicted). The plurality client computers 108a-e, may also send out more replicas of the malicious payload to potentially more client computers inside or outside the internal network 102. In this way, an outside attacking computer 104 may potentially use a small automated script to attack and/or establish control over many clients in an internal network 102. Though in this example only five client computers are sent the payload, in some embodiments the payload may be sent to only two computers, in other embodiments, the payload may be sent to fifteen clients to be infected, in a network comprising 1000 clients for example.

Figure 2B:
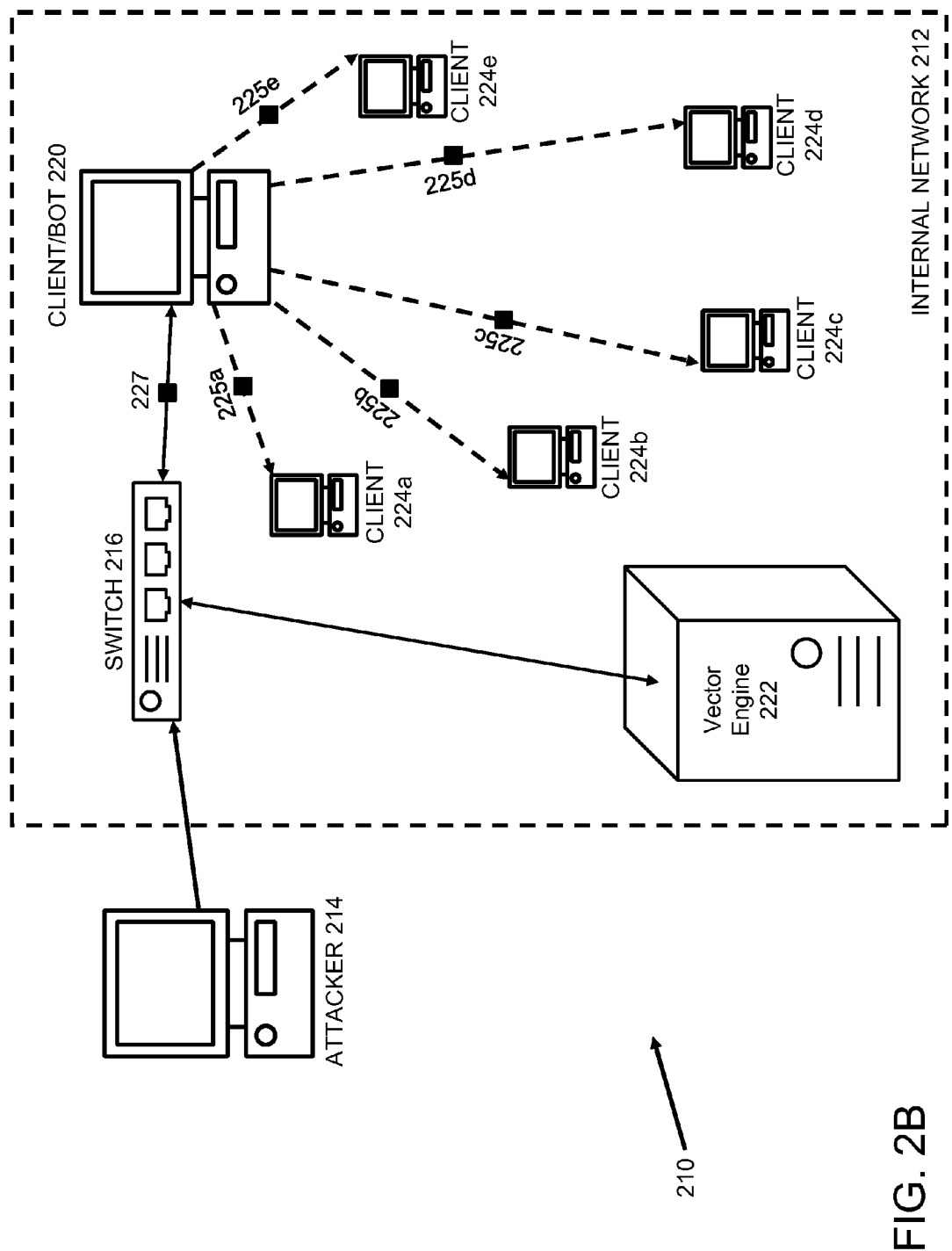
FIG. 2B illustrates an example network in which a vector engine has been implemented, as according to some embodiments.

FIG. 2A shows an example flowchart 200 of an approach for how a vector engine may be implemented to detect the network threats, such as the example attack described with reference to FIG. 1. Also, FIG. 2A is explained in conjunction with FIG. 2B and FIG. 2C, which show examples of how a vector engine may be implemented in a network setting.

At 202 (FIG. 2A), the vector engine receives network communications for a given network. FIG. 2B illustrates an example network in which step 202 may occur. There, an example of networking environment 210 comprises an internal network 212, which may be isolated by networking components and devices as are known in the art, such as a firewall (not depicted). A plurality of client computers 220 and 224a-e may be networked together to communicate through use of a network switch 216 or other networking components. In some embodiments, the vector engine 222 may receive network communications for the internal network 212 through the network switch 216. The vector engine 222 can also be implemented as software that resides upon networking equipment, nodes, or entities within a network (e.g., internal network 212). Finally, the vector engine 222 can be implemented in a virtual machine and be deployed on hardware supplied by the company that owns the network. Further details of an example approaches receiving, pre-processing, and network integration of a detection system is described in U.S. Non-Provisional application Ser. No. 14/643,931, titled "A SYSTEM AND METHOD FOR DETECTING INTRUSIONS THROUGH REAL-TIME PROCESSING OF TRAFFIC WITH EXTENSIVE HISTORICAL PERSPECTIVE", filed on Mar. 10, 2015, which is hereby incorporated by reference in its entirety.

In FIG. 2B, an outside computer or entity is illustrated as an attacker 214. The attacker 214 may interface with the internal network 212 through the switch 216 to send a malicious payload 227 (e.g., a payload linked through or attached to an email) to the client computer 220. When the client computer 220 processes the malicious payload 227, it becomes a "bot". Alternately, the client computer could become a "bot" under many other circumstances, including, but not limited to, getting infected when browsing a compromised web site.

Under the direction of the malicious payload (and in some cases under the direction of the attacker 214), the bot 220 sends a plurality of requests 225a-e (represented by dashed lines) to the respective client computers 224a-e. The requests 225a-e in this example are copies of the malicious payload 227 or of an entirely new malicious payload, and as such all requests 225a-e may have the same or similar sizes (e.g., ~1 MB). Further, the requests 225a-e may also be addressed to the same destination port on each client machine 224a-e, respectively (e.g., request 225a is addressed to example TCP port "135" on client 224a, while request 225b is addressed to the same example TCP port "135" but on client 224b.).

Figure 2C:
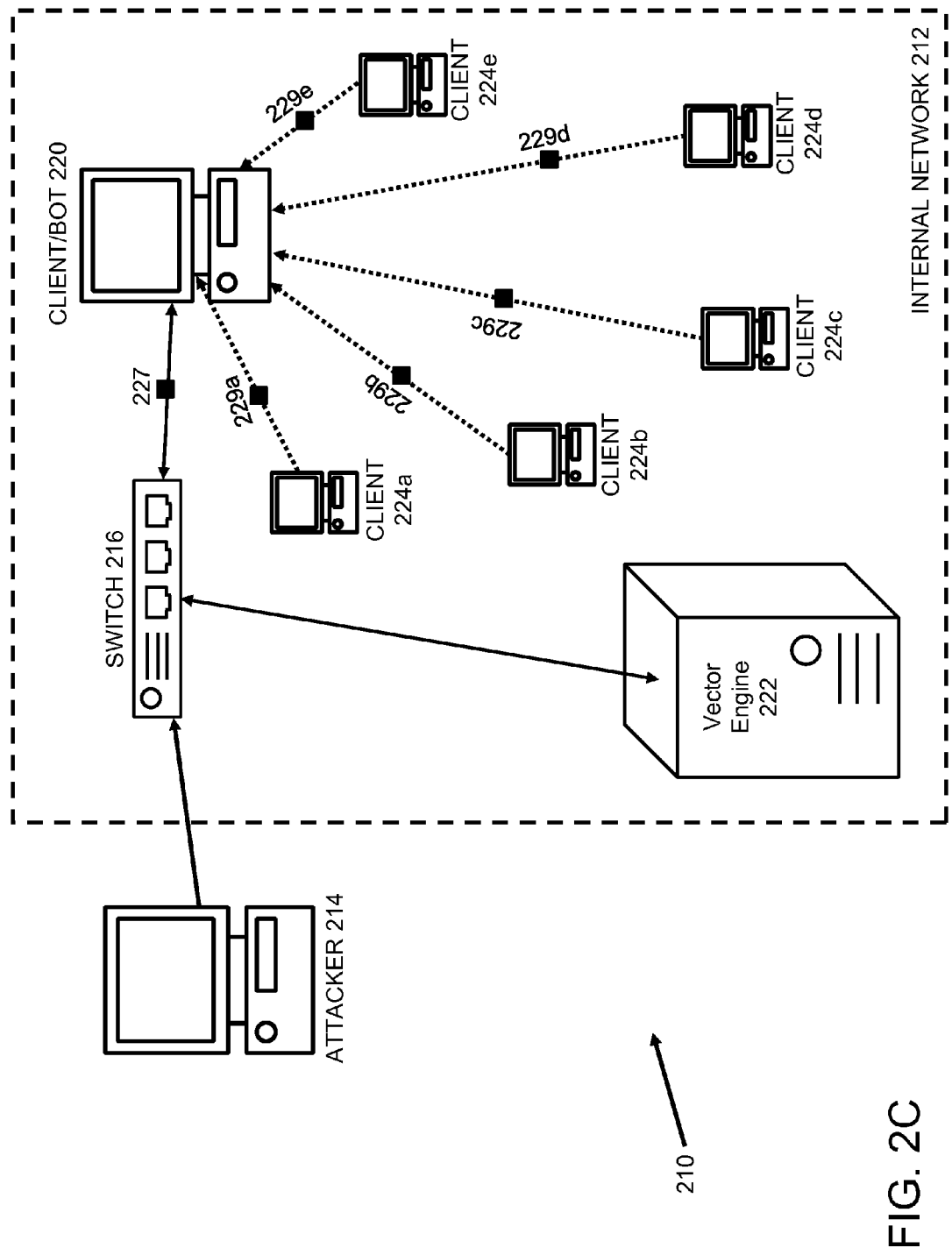
FIG. 2C illustrates an example internal network in which a vector engine has been implemented, as according to some embodiments.

When the plurality of client machines 224a-e, receive and process the requests 225a-e, they may reply to the bot 220 with a response 229a-e, as illustrated by dotted lines in FIG. 2C. Since the requests 225a-e consisted of replicas of the same malicious payload, when each client machine 224a-e processes the request, the client machines may send similar responses to the bot 220. Thus, the responses 229a-e may all be approximately the same size and share similar characteristics with one another.

As explained, in some cases, the malicious payload 227 consists of an automated script that when processed causes actions to occur automatically or near instantaneously. And in some case, the malicious payloads 225a-e, sent by the bot 220, is the same as the malicious payload 227 it received. Given the nature of malicious payloads, the high speed of networks, and the speed of computing devices, such as those shown in FIG. 2B and FIG. 2C, the time elapsed between the requests 225a-e (FIG. 2B) and the responses 229a-e (FIG. 2C) may be small (e.g., as little as five seconds).

Collectively, the communications (e.g., the requests and responses) comprise the network communications that the vector engine can receive and analyze at 202 (FIG. 2A). Next, at 204, the vector engine may extract vector metadata from the network communications. Though explained in greater detail below with reference to FIG. 4, vector metadata is briefly explained here as metadata that can be used to describe the network communications so that the vector engine can group or cluster the metadata and/or network communications for further analysis. For example, the metadata may comprise packet header information, or information about the session (e.g., time between request/responses).

At 206, after the metadata is extracted, the vector engine may group the metadata into clusters using a matching process. The metadata clusters may then be used to track how many instances of a given network communication has occurred. For example, with reference to FIG. 2B and FIG. 2C, the bot 220 has sent out five requests (e.g., 225a-e), and received five responses (e.g., 229a-e), thus in one cluster there may be five instances of metadata that correspond to the five actual network communication exchanges.

The vector engine can set threshold size limits on the clusters to monitor them. The underlying rationale being that if a given cluster grows too large, the metadata instances in the cluster correspond to a rapidly growing network attack using malicious payloads, such as an automated script. For example, with reference to FIG. 2B and FIG. 2C, if the cluster (not depicted) that is tracking the five network communications (e.g., the five instances of requests and responses) has a threshold size limit of three, the vector engine may generate an alarm at 208 (FIG. 2A), to signal that the internal network 212 and specifically the bot 220 may be infected and attacking other clients when the five instances of metadata are grouped in one cluster.

Figure 3:
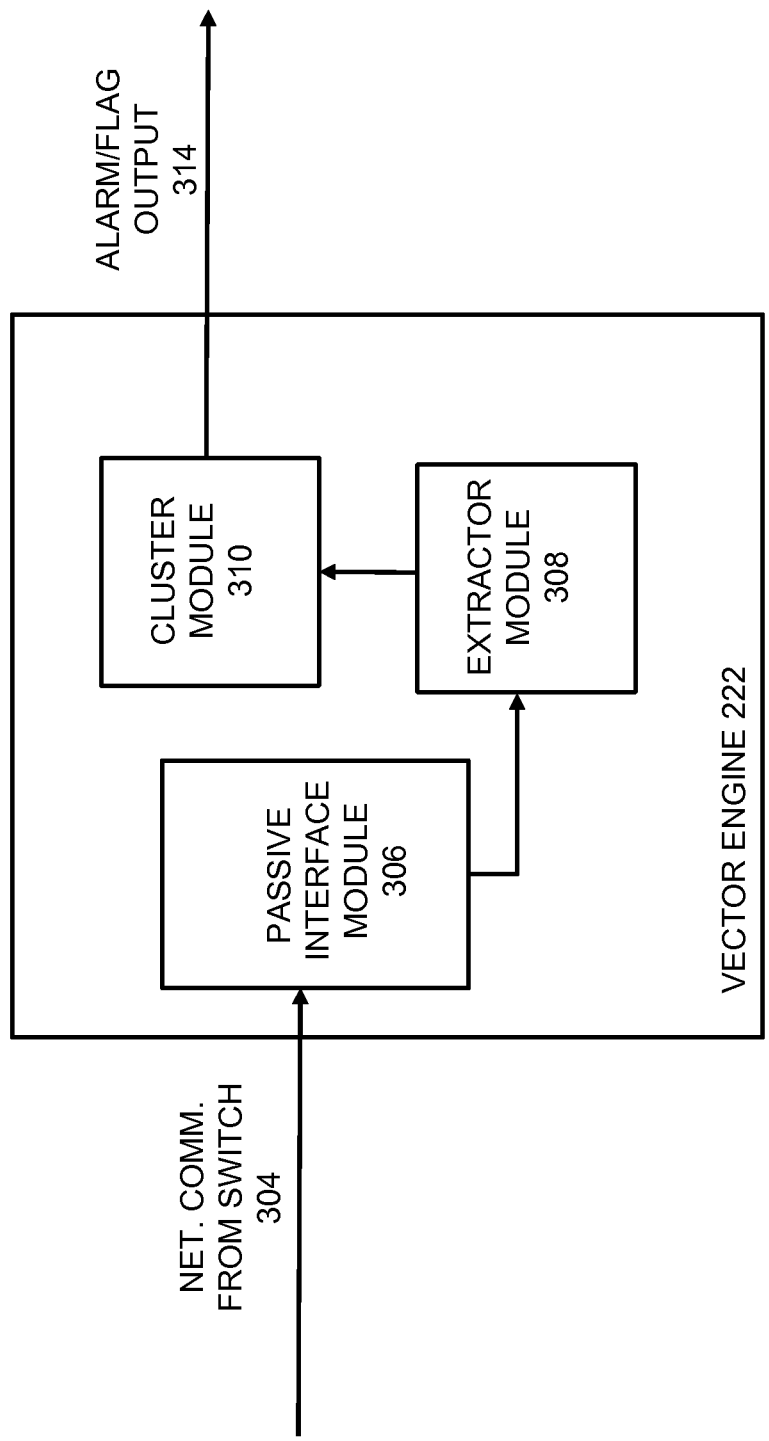
FIG. 3 illustrates an example block diagram showing internal features of a vector engine.

FIG. 3 illustrates an example block diagram showing internal features of a vector engine 222. There, vector engine 222 contains a passive interface module 306 that is designed to passively receive network communications, such as from a network switch 304. The passive interface module may then send the network communications to an extractor module 308 to extract one or more instances of metadata that correspond to each network communication.

Once the metadata instances are extracted from the network communications, a cluster module may group the metadata instances into clusters. As explained, each cluster may have a threshold size limit such that if the amount of metadata instances in the cluster exceeds a threshold an alarm may be generated and output at 314.

Figure 4:
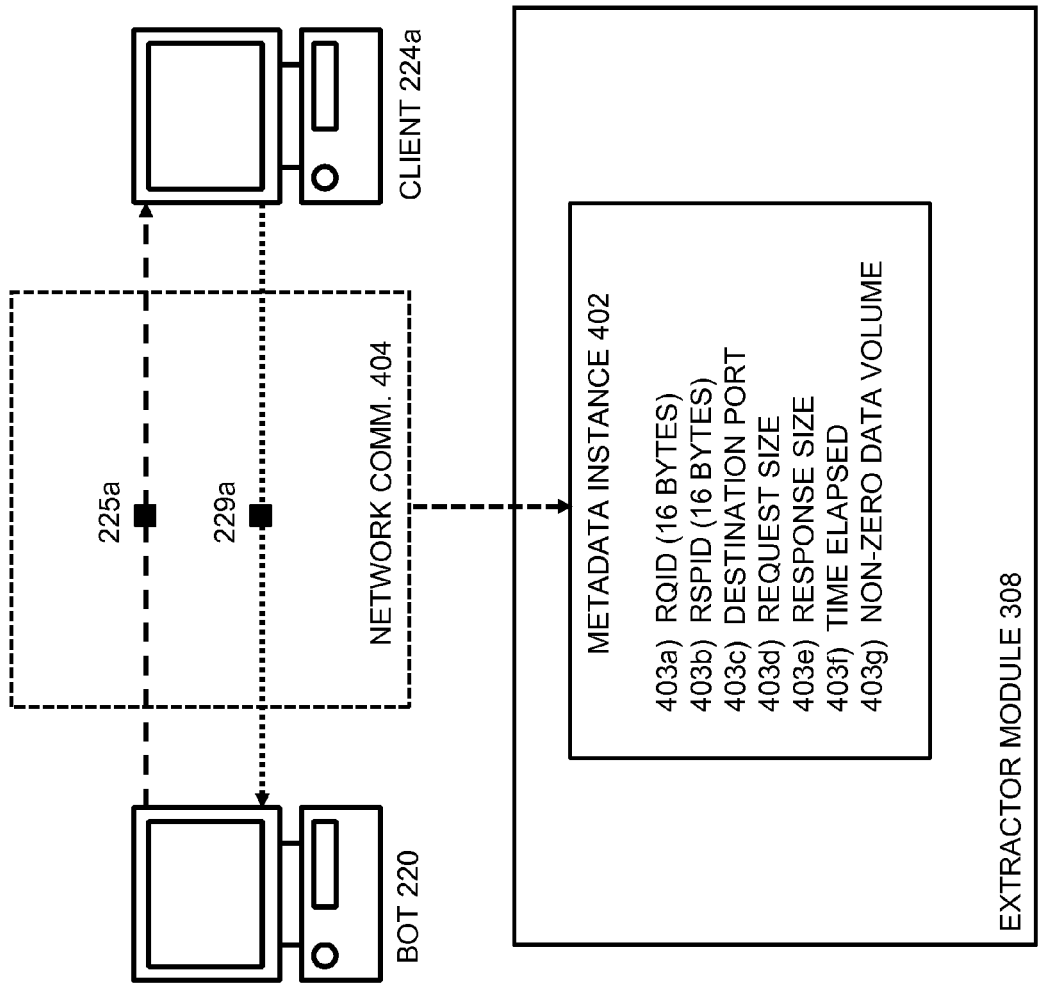
FIG. 4 shows example details of how metadata may be extracted from network communications.

FIG. 4 shows example details of a metadata instance for a given network communication. There, bot 220 has sent a request 225a containing a malicious payload to a client computer 224a. When the client computer 224a processes the malicious payload it may send a response 229a back to the bot 220. Collectively, the request 225a and the response 229a may comprise a single instance of a network communication 404. For example, network communication may correspond to a complete session or portion of a session. The extractor module 308 may receive the network communication 404 and extract one or more metadata items 403a-g that describe the network communication 404. The one or more metadata items correspond to a metadata instance 402 that describes the network communication 404 without the need for inspecting the contents of the request or the response. The contents of the network communication may comprise the "data" payload for a given network packet.

The metadata items illustrated serve merely as an example of a possible set of metadata that may be extracted from a network communication, though one of ordinary skill in the art appreciates that other metadata items can be implemented as necessary.

In some embodiments, a communication identifier such as a request identifier (RQID) 403a may correspond to the starting bytes of a packet. For example, request identifier 403a may comprise the first sixteen bytes of a request of communication 225a. Generally, the first bytes of a request contain header information or other data that is common across all requests 225a-e (FIG. 2B). In this way, the first sixteen bytes can be used to identify similar requests without inspecting the contents or data payload of the communications and/or packets.

Similarly, the response identifier (RSPID) 403, may be the first sixteen bytes of a response, such as communication 229a. Because the response is generally a message created in response to the malicious payload being processed (e.g., executed), responses then generally contain the same header information. Just as with RQID 403a, RSPID 403b can likewise be used to identify similar responses without inspecting the contents of the response.

The destination port metadata data item 403c corresponds to the protocol (e.g., TCP or UDP) and port on the receiving machine (e.g., 224a-e) to which a request is directed. As explained above, malicious payloads in the form of automated scripts may be restricted to small payload sizes to remain inconspicuous in the network. As such, malicious payloads often direct the bot 220 to send the replicated malicious payloads to the same destination port (as opposed to specifying multiple addresses/ports which may take up more space). Because the replicated malicious payloads (e.g., the requests) are all sent to the same destination port on each respective client machine 224a-e, the destination port metadata data item 403c may be used to match similar network communications that are initiated by the same malicious payload.

The request size metadata data item 403d describes the size of a request, such as a request 225a. Because the requests sent to clients 224a-e are generally the same, they likely share the same request size. If the requests sent to clients 224a-e are also copies of the original malicious payload 227, the sizes of the requests sent to clients 224a-e will be approximately the same as the size of payload 227. Thus, the request size metadata item 403d can be used to detect matching requests. Similarly, the response size metadata data item 403e describes the size of a response, such as response 229a. Because the responses 229a-e (FIG. 2C) are typically all generated in response to the same requests 225a-e, the responses may all have approximately the same sizes as well. Thus, the response size 403e can be used to detect matching responses.

The time elapsed metadata data item 403f describes the length of time between when a request was sent out and when a response was sent back. Because the targeted hosts may be generally quick to process automated scripts and other types of network attacks, the time between request and response may be very short, e.g., less than five seconds. Thus, it may be the case that the duration of time between when each request 225a-e was sent and when each corresponding response was sent is roughly the same. Thus, the time elapsed data item 403f can be used to describe and match similar network communications.

The non-zero data volume metadata data item 403g is a metadata item that ensures that all analyzed network communications are not empty. For example, referring to FIG. 2B, if the request 225a contains actual malicious payload data, then the non-zero data volume metadata data item 403g will reflect that the request is not empty. However, if 225b was sent in error and is empty, then the non-zero metadata item 403g will reflect that the request 225b is empty. To save system resources, some embodiments of the invention may use the non-zero data volume metadata item 403g to filter out all empty network communications.

Collectively, the metadata items 403a-g may comprise a single metadata instance particular to a given network communication, such as network communication 404. Once the metadata items are extracted to compose one or more metadata instances, the cluster module can group the metadata instances into clusters using a cluster module.

Figure 5A:
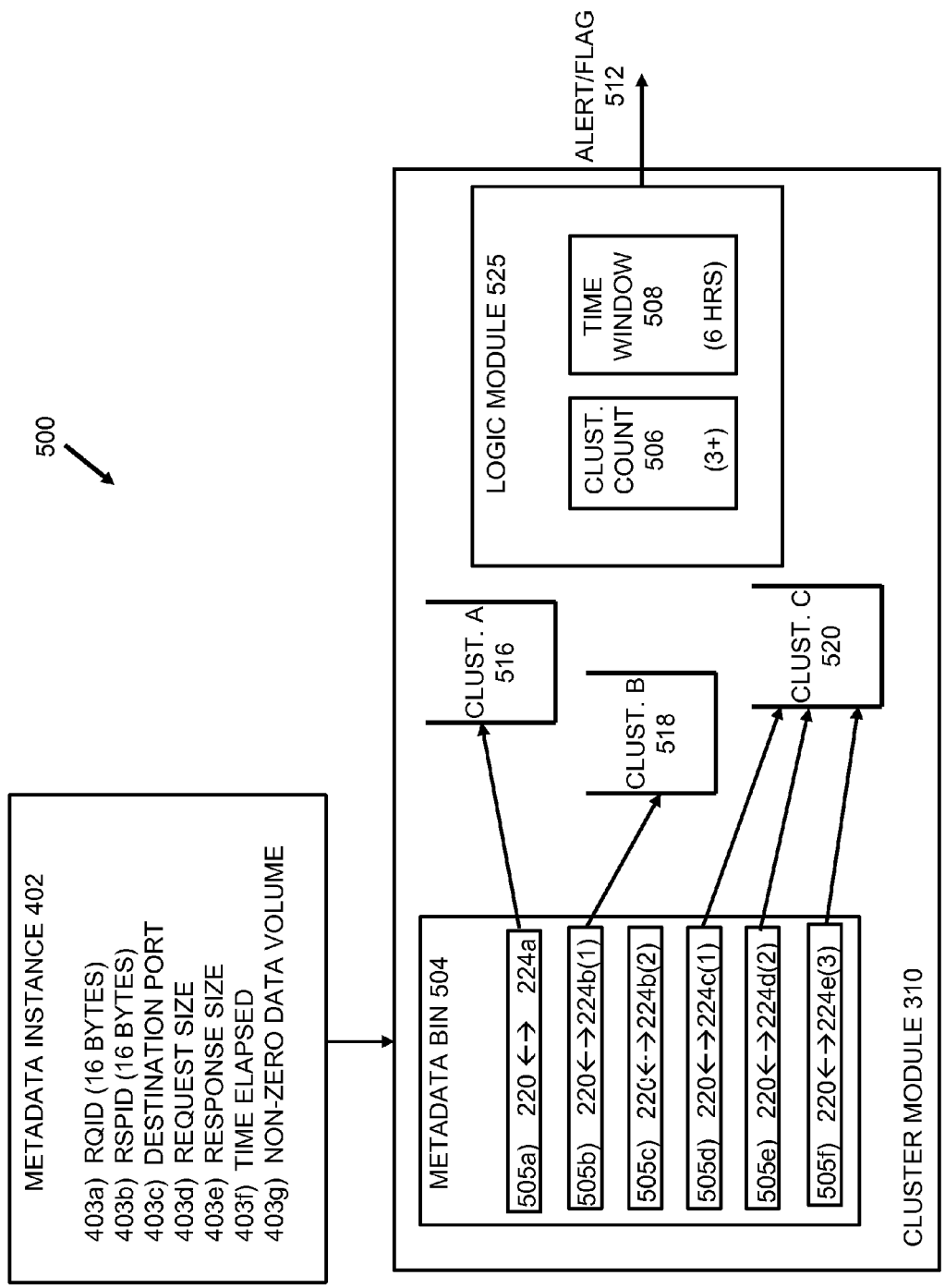
FIG. 5A shows an examples of clustering metadata.

FIG. 5A shows an example block diagram 500 of how aspects of the cluster module 310 may be implemented. There, a metadata instance 402 is received from the extractor module 308. The cluster module 310 may buffer one or more metadata instances in a metadata bin 504. As illustrated for this example, metadata bin 504 contains six metadata instances 505a-f. The cluster module 310 may group the metadata instances into metadata clusters (e.g., Cluster-A 516, Cluster-B 518, Cluster-C 520) using a matching process, explained in greater detail below. However, as an example, metadata instances 505d, 505e, 505f are all grouped into the same cluster, Cluster-C 520 because some or all of their metadata items have been determined to approximately match.

As explained, each cluster may have a threshold size limit such that if the threshold is exceeded an alarm is generated. In some embodiments, the cluster module 310 may implement a logic module 525 to keep track of cluster counts and a time window to expire old metadata instances. The cluster count module 506 can hold a data value that corresponds to the threshold size limit and further monitor the cluster count for each module. For example, if the cluster count module 506 sets the threshold to be "2", then Cluster-C 520, which currently holds three metadata instances (505d, 505e, and 505f), would exceed the threshold, and the cluster count module and/or the logic module 525 may generate an alarm data for output at 512.

In some embodiments, the time window module 508 may operate as a sliding window of a discrete duration. For example, if the sliding window time duration is 6 hours, as illustrated in FIG. 5A (see element 508), then metadata instances in the clusters that are older than 6 hours are expired and removed from the cluster. The expiring and removing of old metadata instances using a sliding window can protect against false positives caused by potential build-up of unrelated metadata instances over very long periods of time. Further, though specific examples are used here for the threshold size limit (e.g., 3) and the time duration (e.g., six hours), one of ordinary skill in the art appreciates that such parameters can be modified or customized per implementation, as required.

Thus, as FIG. 5A illustrates, the clusters may be required to satisfy two conditions before an alert may be triggered. First, the cluster must exceed the threshold size limit (e.g., more than three metadata instances), and second, the threshold size must be exceeded in the given time window (e.g., more than three metadata instances within the last six hours). In some embodiments, the second condition is implicit in the checking of the first condition. For example, by constantly removing metadata instances older than six hours, the second condition is automatically enforced.

In some embodiments, the alert data 512 generated by the cluster module 310 may generate an actual alarm automatically. That is, if the threshold size limit is exceeded within the time duration, an alarm is generated without intervention. In some embodiments, if the threshold size limit is exceeded within the time duration, the corresponding network activity is flagged as potentially malicious activity and no alarm is directly generated. In this way, the potentially malicious activity may be combined with other unrelated anomalies to generate an automatic alarm or network administrators or security administrators can further monitor the network activity and manually generate an alarm as required.

Further, in some embodiments, a training window or period may be implemented, where the metadata instances are grouped into clusters to generate a baseline state of the network. The training period may be set to a time duration such as 24 hours. For example, the cluster module may group metadata instances into clusters for the first 24 hours to ascertain the appropriate value to set for each cluster's threshold size limit and may decide that special limits are required for some clients in the network. The training window could be used to identify periodic network communications that satisfy all the criteria to generate an alert, but that, as they happen relatively regularly in the network, could be associated to benign communications intentionally initiated from an uninfected client by a given user or process.

Figure 5B:
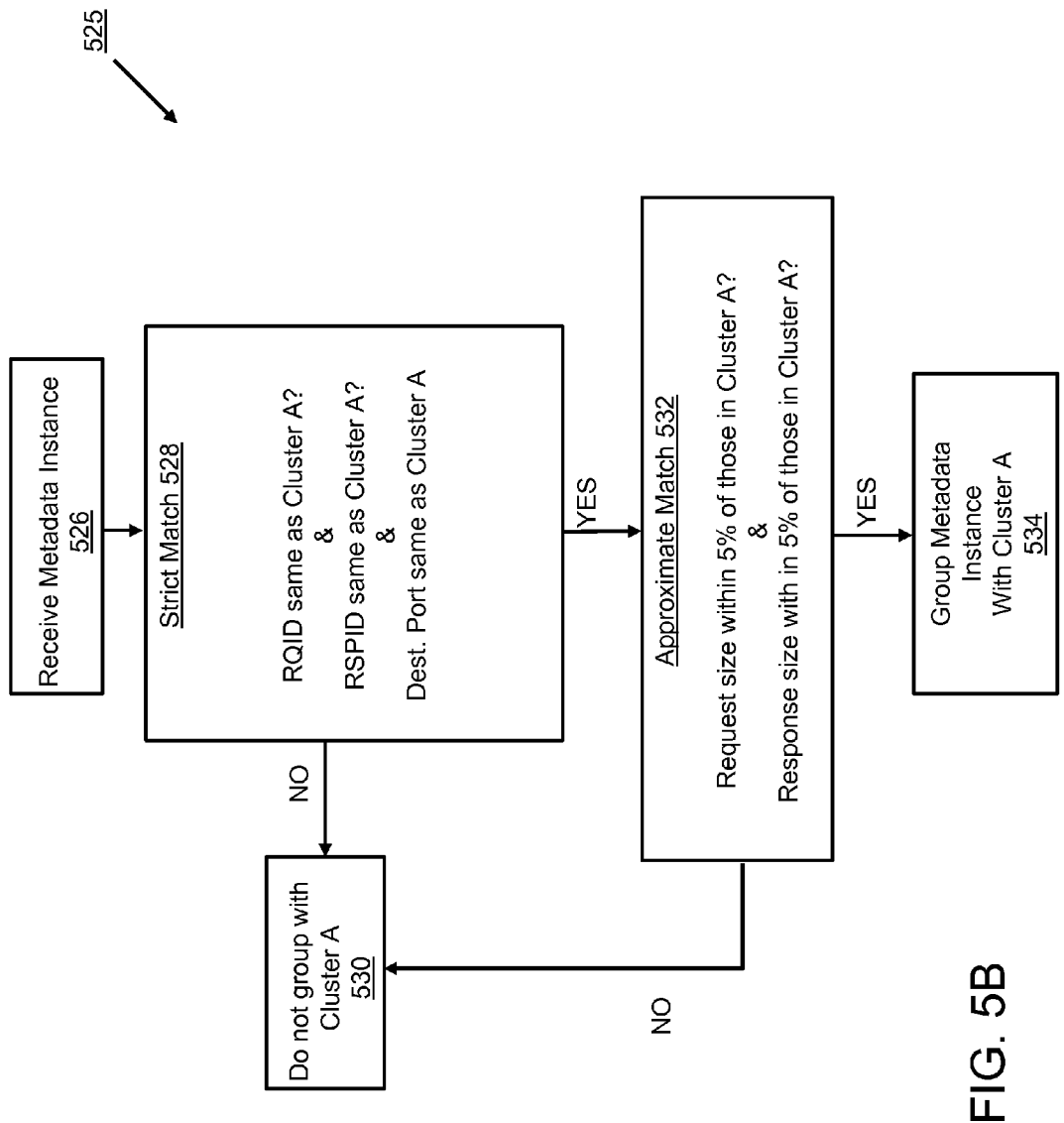
FIG. 5B shows an example flowchart for an approach for clustering metadata instances into similar clusters.

FIG. 5B shows a flowchart on an approach for how metadata instances may be grouped into clusters. At 526, the cluster module receives a group of metadata instances for analysis and grouping. At 528, the cluster module analyzes the metadata instances in a strict match stage. In the strict match stage 528, in order for one or more metadata instances to be grouped together, certain metadata items in each metadata instance must exactly match one another, or must exactly match metadata items of instances already in the cluster. For example, referring to FIG. 2B, if the request identifier (RQID) 403a for the request 225a exactly matches the request identifier (RQID) 403a for a different request 225b, then the corresponding metadata instances may be grouped together in the same cluster (assuming the other requirements are met).

As illustrated in FIG. 5B, the strict match items for Cluster-A, as an example, may include the following metadata items: RQID 403a, RSPID 403b, and Destination Port 403c, Thus, to be grouped in Cluster-A at the strict match stage 528, a metadata instance must have the above metadata items exactly match the metadata instances already in Cluster-A or exactly matched to another metadata instance to start/form a cluster.

If a metadata instance under consideration has metadata items that do not strictly match those in Cluster-A, for example, then the metadata instance is not grouped with Cluster-A at 530. Though continuing, if the metadata instance under consideration does in fact have metadata items that exactly match each other or those in Cluster-A, then the metadata instance may be analyzed in the approximate match stage 532.

In the approximate match stage 532, a metadata instance is analyzed to determine whether certain metadata items in the metadata instance approximately match each other or those in the cluster. As illustrated in FIG. 5B, the metadata items in the approximate match stage 532 may include the request size 403d and the response size 403e (e.g., a communication size data item). Further, a range or percentage threshold may be specified to determine whether a given metadata item approximately matches the metadata items in the cluster. For example, in FIG. 5B the range is 5%. Thus, if a request size 403d is within 5% of the average of those request sizes already in the cluster, the corresponding metadata instance may be grouped in the cluster at 534 (assuming other conditions illustrated in FIG. 5B are met).

Figure 5C:
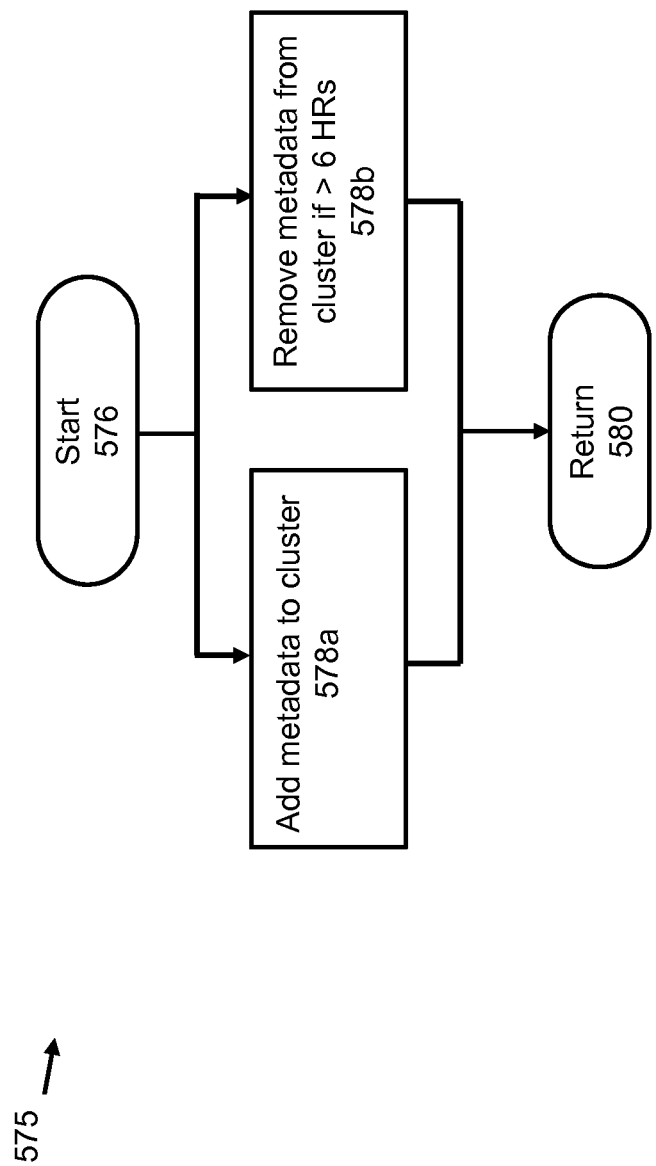
FIG. 5C shows an example flowchart on how to implement a sliding window in the vector engine.

FIG. 5C shows an example flowchart for an approach 575 for how the time window module 508 (FIG. 5A) may be implemented. After a start block at 576, two operations may occur approximately simultaneously. First, using a matching process, such as the one explained above, matching metadata instances can be added to a given cluster, at 578a. Second, as metadata instances are added to the cluster, the time in which they were added is recorded, and when a metadata item is more than six hours old it may be removed from the metadata cluster, at 578*b*. In this way, the time window module implements a sliding window that is six hours wide to incrementally remove old metadata instances, as new metadata instances are added. In some embodiments, the metadata bin 504 (FIG. 5A) may be allowed to buffer for six hours at a time. At each six-hour increment, the metadata instances buffered in the metadata bin 504 are then grouped into clusters. Once the metadata bin 504 is empty, new metadata instances may be buffered in the bin for another six hours. In this way, the time window module 508 may also implement a buffered or turn-based grouping process.

Figure 5D:
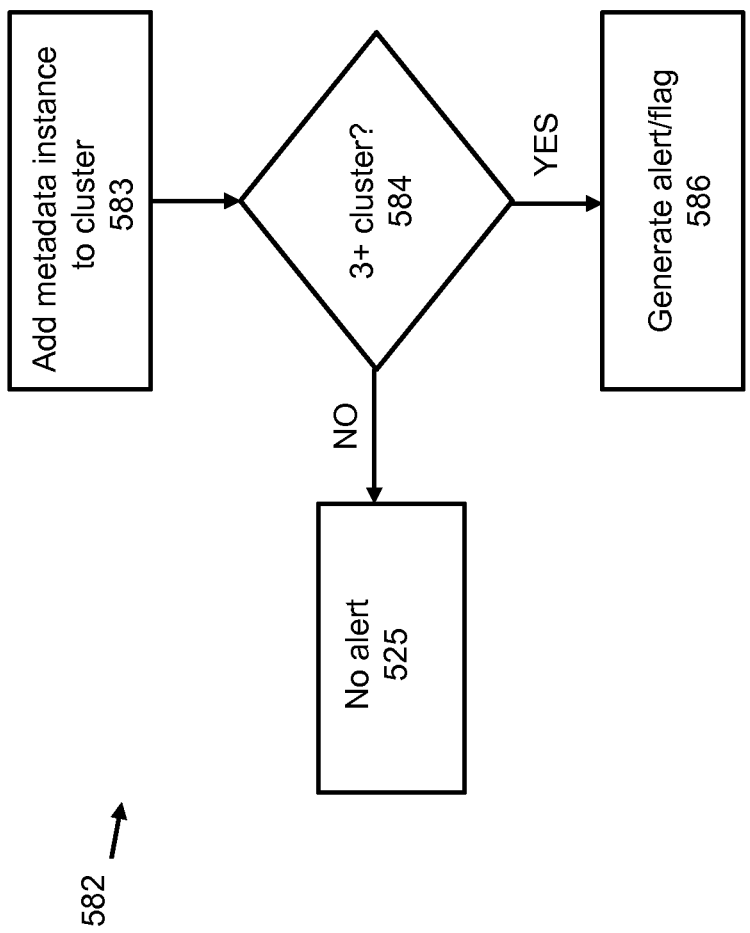
FIG. 5D shows an example flowchart on how to detect whether the number of metadata instances in a cluster exceeds a threshold.

FIG. 5D illustrates a flowchart for one approach 582 for determining whether a threshold size limit has been exceeded. At 583, a new matching metadata instance is added to a cluster. At 584, after the new metadata instance is added to the cluster, a determination is made on whether the cluster contains more than the threshold size limit. For example, if the threshold size limit is 3, then at 584 the cluster count module 506 determines whether there are more than 3 metadata instances in the cluster. If the cluster does not have more than three metadata instances, the threshold size limit is not exceeded and no alarm data is generated, at 585. On the other hand, if after adding the new matching metadata instance, the cluster contains more than three metadata instances, the threshold size limit is exceeded and an alarm may be generated, at 586.

System Architecture Overview

Figure 6:
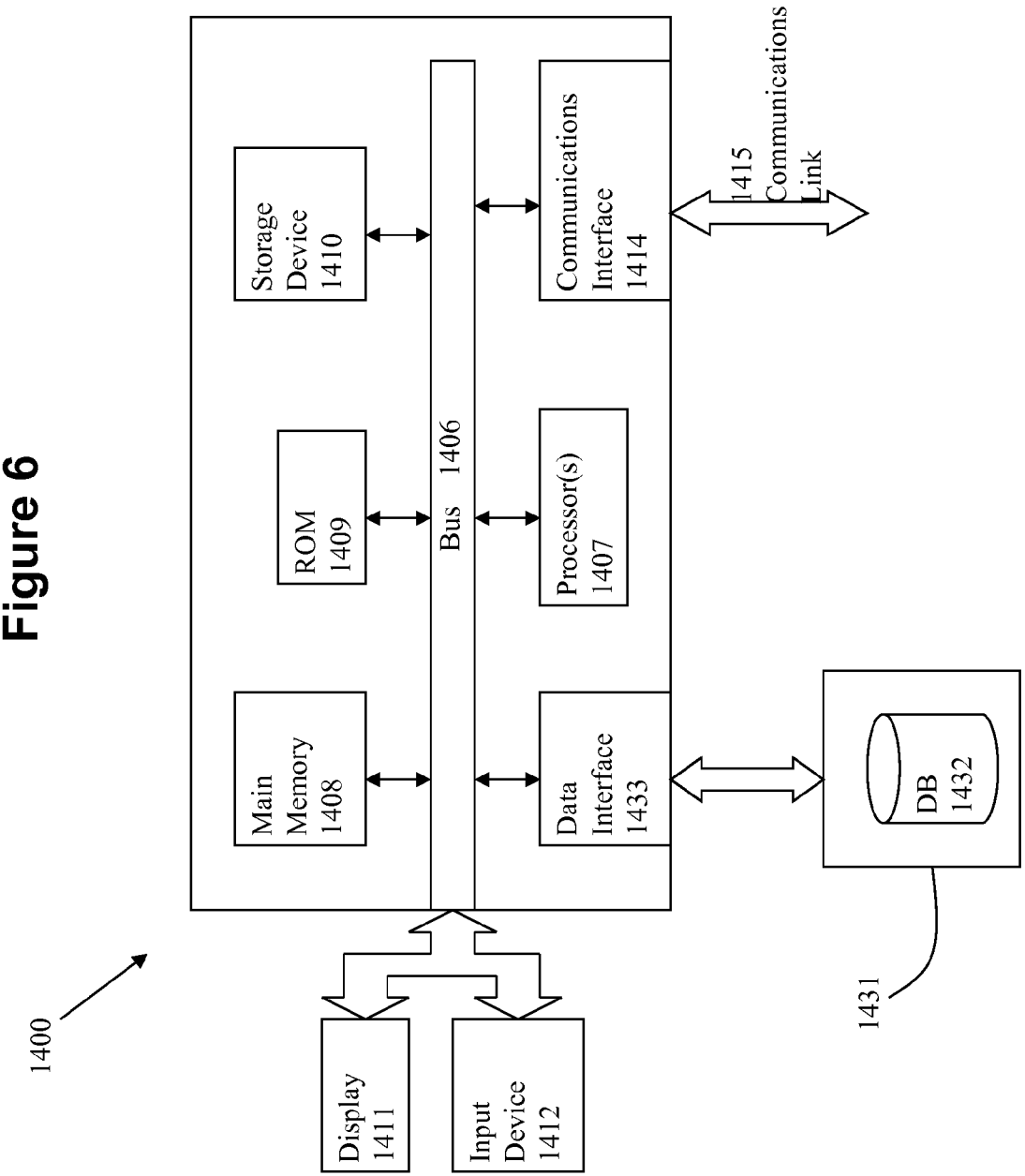
FIG. 6 illustrates example system architecture.

FIG. 6 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed:

1. A method for detecting threats in networks using metadata, comprising:

receiving one or more network communications by tapping a network device that routes network communications between a single host and multiple hosts, wherein a network communication comprises at least a first communication in a first direction from the single host to the multiple hosts and a second communication in a second direction from the multiple hosts to the single host, the first communication corresponding to the single host sending copies of a payload to the multiple hosts, the second communication corresponding to response messages sent by the multiple hosts initiated in response to receiving copies of the payload from the single host, the second direction being opposite of the first direction;

extracting one or more metadata instances from the network communications that describe the network communications without inspecting contents of the network communications, grouping the metadata instances into one or more clusters based on whether the metadata instances match; and generating alert data for a cluster when an amount of metadata instances in the cluster exceeds a threshold.

2. The method of claim 1, wherein the clusters correspond to a sliding window in which metadata instances older than a time duration are removed.

3. The method of claim 1, wherein network communications are grouped into clusters by matching a plurality of metadata items in a first metadata instance to a plurality of metadata items in a second metadata instance.

4. The method of claim 3, wherein the metadata items comprise at least one or more of the following group: a first communication identifier, a second communication identifier, a destination port data item, a first communication size data item, a second communication size data item, a time elapsed data item, or a non-zero data volume data item.

5. The method of claim 4, wherein two metadata instances are grouped into a same cluster if one or more metadata items belonging to each of the two metadata instances strictly match.

6. The method of claim 4, wherein two metadata instances are grouped into a same cluster if one or more metadata items belonging to each of the two metadata instances are within a specified range or percentage threshold.

7. The method of claim 1, further comprising a training window in which network communications are grouped into clusters.

8. The method of claim 4, wherein the first communication identifier corresponds to a number of starting bytes of the first communication, and the second communication identifier corresponds to a number of starting bytes of the second communication.

9. A system for detecting threats in networks using metadata, comprising:
   a computer processor to execute a set of program code instructions;
   a memory to hold the set of program code instructions, in which the set of program code instructions comprises program code to perform:
     receiving one or more network communications by tapping a network device that routes network communications between a single host and multiple hosts, wherein a network communication comprises at least a first communication in a first direction from the single host to the multiple hosts and a second communication in a second direction from the multiple hosts to the single host, the first communication corresponding to the single host sending copies of a payload to the multiple hosts, the second communication corresponding to response messages sent by the multiple hosts initiated in response to receiving copies of the payload from the single host, the second direction being opposite of the first direction;
     extracting one or more metadata instances from the network communications that describe the network communications without inspecting contents of the network communications,
     grouping the metadata instances into one or more clusters based on whether the metadata instances match; and
     generating alert data for a cluster when an amount of metadata instances in the cluster exceeds a threshold.

10. The system of claim 9, wherein the clusters correspond to a sliding window in which metadata instances older than a time duration are removed.

11. The system of claim 9, wherein network communications are grouped into clusters by matching a plurality of metadata items.

12. The system of claim 11, wherein the metadata items comprise at least one or more of the following group: a first communication identifier, a second communication identifier, a destination port data item, a first communication size data item, a second communication size data item, a time elapsed data item, or a non-zero data volume data item.

13. The system of claim 12, wherein two metadata instances are grouped into a same cluster if one or more metadata items belonging to each of the two metadata instances strictly match.

14. The system of claim 12, wherein two metadata instances are grouped into a same cluster if one or more metadata items belonging to each of the two metadata instances are within a specified range or percentage threshold.

15. The system of claim 9, further comprising a training window in which network communications are grouped into clusters.

16. The system of claim 12, wherein the first communication identifier corresponds to a number of starting bytes of the first communication, and the second communication identifier corresponds to a number of starting bytes of the second communication.

17. A computer program product embodied on a non-transitory computer readable medium, the non-transitory computer readable medium having stored thereon a sequence of instructions which, when executed by a processor causes the processor to execute a method detecting threats, the method comprising:
   receiving one or more network communications by tapping a network device that routes network communications between a single host and multiple hosts, wherein a network communication comprises at least a first communication in a first direction from the single host to the multiple hosts and a second communication in a second direction from the multiple hosts to the single host, the first communication corresponding to the single host sending copies of a payload to the multiple hosts, the second communication corresponding to response messages sent by the multiple hosts initiated in response to receiving copies of the payload from the single host, the second direction being opposite of the first direction;
   extracting one or more metadata instances from the network communications that describe the network communications without inspecting contents of the network communications;
   grouping the metadata instances into one or more clusters based on whether the metadata instances match; and
   generating alert data for a cluster when an amount of metadata instances in the cluster exceeds a threshold.

18. The computer program product of claim 17, wherein the clusters correspond to a sliding window in which metadata instances older than a time duration are removed.

19. The computer program product of claim 17, wherein network communications are grouped into clusters by matching a plurality metadata items.

20. The computer program product of claim 19, wherein the metadata items comprise at least one or more of the following group: a first communication identifier, a second communication identifier, a destination port data item, a first communication size data item, a second communication size data item, a time elapsed data item, or a non-zero data volume data item.

21. The computer program product of claim 20, wherein two metadata instances are grouped into a same cluster if one or more metadata items belonging to each of the two metadata instances strictly match.

22. The computer program product of claim 20, wherein two metadata instances are grouped into a same cluster if one or more metadata items belonging to each of the two metadata instances are within a specified range or percentage threshold.

23. The computer program product of claim 17, further comprising a training window in which network communications are grouped into clusters.

24. The computer program product of claim 20, wherein the first communication identifier corresponds to a number of starting bytes of the first communication, and the second communication identifier corresponds to a number of starting bytes of the second communication.

* * * * *